United States Patent
He et al.

(10) Patent No.: US 8,379,115 B2
(45) Date of Patent: Feb. 19, 2013

(54) IMAGE CAPTURE DEVICE WITH ELECTRONIC FOCUS

(75) Inventors: Fan He, Gurnee, IL (US); Kevin Johnson, Mundelein, IL (US); Dongxue Wang, Palatine, IL (US)

(73) Assignee: Motorola Mobility LLC, Libertyville, IL (US)

( * ) Notice: Subject to any disclaimer, the term of this patent is extended or adjusted under 35 U.S.C. 154(b) by 345 days.

(21) Appl. No.: 11/943,224

(22) Filed: Nov. 20, 2007

(65) Prior Publication Data

US 2009/0128682 A1    May 21, 2009

(51) Int. Cl.
*H04N 5/262*    (2006.01)
*H04N 5/225*    (2006.01)
*H04N 9/07*    (2006.01)

(52) U.S. Cl. .............. 348/240.99; 348/220.1; 348/267

(58) Field of Classification Search .............. 348/218.1, 348/220.1, 240.99, 267
See application file for complete search history.

(56) References Cited

U.S. PATENT DOCUMENTS

| | | | |
|---|---|---|---|
| 4,322,130 A * | 3/1982 | Ito et al. ..................... | 359/584 |
| 5,748,371 A | 5/1998 | Cathey et al. | |
| 6,373,640 B1 | 4/2002 | Betensky et al. | |
| 6,781,127 B1 * | 8/2004 | Wolff et al. ................. | 250/332 |
| 6,833,223 B2 | 12/2004 | Shiraishi | |
| 6,842,297 B2 | 1/2005 | Dowski | |
| 6,999,649 B1 | 2/2006 | Chen et al. | |
| 7,042,615 B2 | 5/2006 | Richardson | |
| 7,116,480 B1 | 10/2006 | Li | |
| 7,493,032 B2 * | 2/2009 | Chang ......................... | 396/72 |
| 2002/0136150 A1 | 9/2002 | Mihara et al. | |
| 2003/0179382 A1 * | 9/2003 | Peterson et al. ............ | 356/502 |
| 2004/0021921 A1 * | 2/2004 | Richardson ................. | 359/196 |
| 2004/0179125 A1 * | 9/2004 | Nagaoka ..................... | 348/335 |
| 2004/0184163 A1 | 9/2004 | Nishioka et al. | |
| 2006/0098968 A1 * | 5/2006 | Ito et al. ..................... | 396/85 |
| 2007/0166026 A1 * | 7/2007 | Matsuzawa et al. ......... | 396/529 |
| 2007/0183760 A1 * | 8/2007 | Mizuno et al. ............... | 396/18 |
| 2008/0129857 A1 * | 6/2008 | Vau et al. .................... | 348/345 |
| 2008/0158551 A1 * | 7/2008 | Hess ............................ | 356/73 |
| 2009/0128664 A1 | 5/2009 | He et al. | |

FOREIGN PATENT DOCUMENTS

| | | |
|---|---|---|
| JP | 56052708 | 5/1981 |
| JP | 2007-140308 | 6/1995 |
| JP | 2003-161874 | 6/2003 |
| JP | 2006-171449 | 6/2006 |
| WO | WO-2005/125184 | 12/2005 |

(Continued)

OTHER PUBLICATIONS

Trehan, Ashkay "Non-Final Office Action", U.S. Appl. No. 11/943,249, filed Nov. 20, 2007, Fan He, first inventor, Mailed Jun. 25, 2010.

(Continued)

*Primary Examiner* — Lin Ye
*Assistant Examiner* — Euel Cowan (57) ABSTRACT

An image capture system is configured to automatically focus upon an object (113) electronically, without moving mechanical parts. In one embodiment, a focal length alteration device (104), examples of which include an electronically switchable mirror (3041,3042) or an interference layer (204), is disposed between a lens assembly (102) and a reflective surface (103). The focal length alteration device (104) is configured to alter the distance light travels from the lens assembly (102) to the image sensor (101). In another embodiment, a light redirection device (1003), such as a phase shifting mirror (703), is configured to alter phases of various polarizations of light. An image processing circuit (105) then resolves images into a single, focused, composite image (113).

17 Claims, 8 Drawing Sheets

FOREIGN PATENT DOCUMENTS

WO    WO-2006/095110    9/2006

OTHER PUBLICATIONS

Kent Optronics, "Kent Optronics Switchable Mirror Technology", http://www.kentoptronics.com/technologies. htm#SwitchableMirror, Nov. 1, 2007.

Trehan, Akshay "Final Office Action", U.S. Appl. No. 11/943,249, filed Nov. 20, 2007, mailed Jan. 5, 2011.

PCT Search Report, PCT/US2008/084048.

PCT Search Report, PCT/US2008/084022.

\* cited by examiner

FIG. 10 ically feasible choices, guided by the concepts and principles disclosed herein will be readily capable of generating such software instructions and programs and ICs with minimal experimentation.

IMAGE CAPTURE DEVICE WITH ELECTRONIC FOCUS

BACKGROUND

1. Technical Field

This invention relates generally to image capture devices having automatic focus capabilities, and more particularly to an image capture device having an electronically controllable focal length adjustment device used for resolving image focus.

2. Background Art

Image capture devices, such as digital cameras, often include an automatic focus feature. This feature allows a user to simply "point and shoot" an image without having to manually focus the camera by physically manipulating a lens element. Conventional "autofocus" cameras generally focus on images by operating a small motor that moves a lens closer to or farther away from an image sensor.

Conventional autofocus features come in two forms: active and passive. In active systems, the camera will send a beacon—such as an infrared or sonic beam—that bounces off an object. Based upon the time delay in receiving the return signal, the camera guesses how far away the object is and moves the lens an appropriate distance away from the image sensor to achieve a reasonably well-focused image. In passive systems, a microprocessor analyzes high frequency components of an image seen by an image sensor and adjusts the distance of the lens relative to the image sensor until a maximum intensity difference between adjacent pixels (sometimes referred to as contrast) is obtained, which is indicative of optimal focus.

Conventional autofocus systems are problematic for modern, small, portable electronic devices such as mobile telephones or handheld computers. First, they are mechanical in nature, requiring substantial space for many moving parts. In small, handheld devices, there is often insufficient space for the motors, lens motion assemblies, and other components that are required. Second, traditional systems employing active autofocus systems require a relatively greater amount of processing power, and correspondingly a general increase power consumption. Passive systems generally have relatively reduced focus ranges, and are generally more greatly impacted at the end of the focus range associated with the resolutions of near-field images. Further, passive systems may generate image "artifacts" or aliasing that compromise the overall integrity of the image.

There is thus a need for an improved focusing system for image capture devices, including handheld electronic devices such as mobile telephones and computers.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to an image capture device configured to electronically focus upon a subject to be captured as part of an image. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of electronically focusing a image as described herein. The non-processor circuits may include, but are not limited to, a microprocessor associated memory, signal drivers, clock circuits, power source circuits, and user input devices. As such, these functions may be interpreted as steps of a method to perform electronic focusing by way of a focal length variation device such as, in one embodiment, a device configured to alter the focal length for at least certain wavelengths by tenths of millimeters. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention provide a simple and cost-effective autofocus image capture device for use with various devices ranging from conventional cameras to portable electronic devices such as mobile telephones or computers. No mechanical motors or moving parts are required to perform the function of automatically focusing on an image as described herein.

In accordance with embodiments of the invention, an image sensor receives light from a lens assembly. When traveling from the lens assembly to the image sensor, the optic path defined by the light is redirected by a reflective surface. A focal length alteration device works in conjunction with the reflective surface to selectively alter focal lengths for various wavelengths of light. For instance, in one embodiment a first color, such as red light, will reach the image sensor at a first focal length. Another color, such as blue or green, will reach the image sensor at a second focal length. An image processing circuit then resolves the separate focal length dependent images together to form a composite focused image. In processing, an image captured at a first focal length within a first wavelength range may be used as a luminous image component, while a second image captured at a second focal length is be used as a color image component. These components can then be resolved to obtain a focused image using color interpolation techniques, color space transformation techniques, or wavefront coding image processing techniques.

Embodiments of the present invention employ different devices as the focal length alteration device. These devices, which are explained in more detail below, include an electronically switchable mirror, an interference layer, filtered switchable mirrors, optically coated mirrors, and phase shifting mirrors. Regardless of the device used, the focal length alteration device works to change the distance between the lens assembly and the image sensor—sometimes by a few tenths of millimeters, as is the case with the switchable mirror, and sometimes by wavelengths, as is the case with the phase shifting mirror. Sometimes this distance change applies to only one wavelength spectrum or color. Sometimes the focal length alteration changes the distance for all wavelengths.

By way of example, when using a switchable mirror as will be described below, when the mirror is in the reflective state, light from the lens assembly is redirected from the switchable mirror to the image sensor along an optical path having a first focal length. When the switchable mirror is in the generally clear or pellucid state, light passes through the switchable mirror to the reflective surface—thereby traversing a greater distance (generally on the order of tenths of millimeters)—to the image sensor along an optical path having a second focal length. This "dual reflecting surface" system provides automatic focusing capabilities without moving parts. The two reflecting surfaces work to change the depth of field of each image, thereby permitting the image processing circuit to abstract a focused image from the sensor data. In addition to automatic focus, devices employing embodiments of the invention may be used for magnification or "zoom" changes, pattern recognition, machine vision, or other applications. Thus, while autofocus will be used as an exemplary application, it will be obvious to those of ordinary skill in the art having the benefit of this disclosure in addition to any skill further readily apparent to the art of the invention that any of these alternate applications may be substituted without changing the spirit or scope of the claims and without departing from the teachings of embodiments of the present invention.

Figure 1:
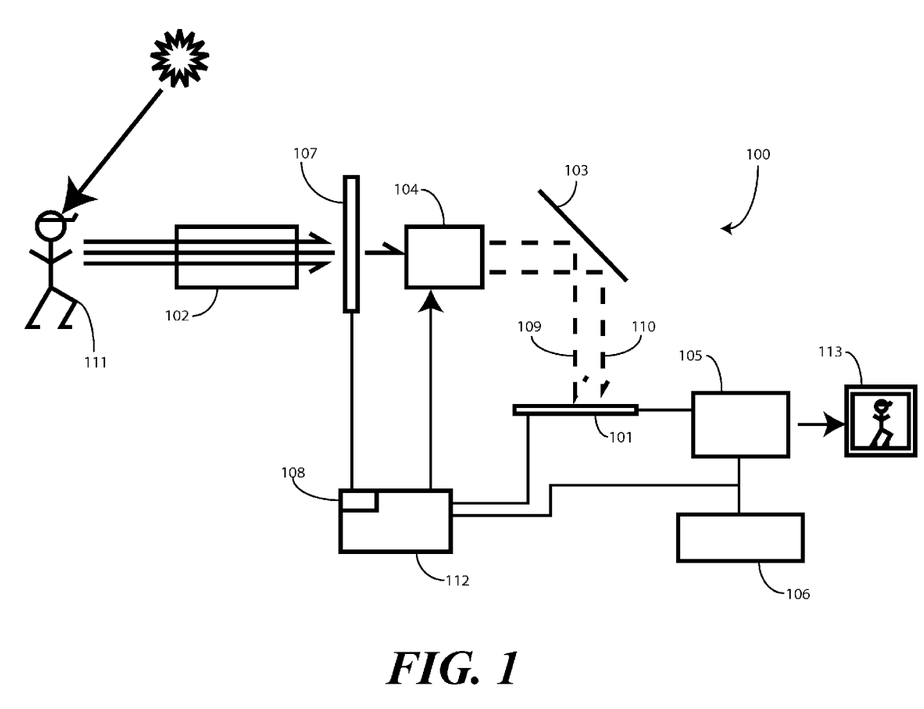
FIG. 1 illustrates a block diagram of an image capture device in accordance with embodiments of the invention.

Turning now to FIG. 1, illustrated therein is one embodiment of an image capture device 100 configured to electronically focus an image in accordance with the invention. The image capture device 100 includes an image sensor 101, a lens assembly 102, a reflective surface 103, and a focal length alteration device 104. In one embodiment, the focal length alteration device 104 is disposed between the lens assembly 102 and the reflective surface 103, and is configured to selectively alter the focal length of an optical path running from the lens assembly 102 to the image sensor 101.

The image sensor 101 is an electronic device configured to sense light and convert that light into binary data suitable for processing by an image processor. Suitable image sensors include charge coupled devices or CMOS sensors. Each of these typically employ an array of light detecting elements formed as part of a semiconductor, sometimes referenced as cells, to convert incident light into electrons. Once converted, processing circuitry reads the charge status of each cell in the sensor and converts this status to a binary value. These values are then stored in memory 106.

The lens assembly 102 may be a single lens. Alternatively, the lens assembly 102 may consist of a group of lenses used to minimize aberrations between image object 111 or subject and image sensor 101. In accordance with embodiments of the invention, the lens assembly 102 is physically and geometrically fixed relative to the image sensor 101. Focus is achieved without movement of the lens assembly 102 relative to the image sensor 101. Thus, motors and other mechanical parts are not required.

The reflective surface 103 is a device configured to redirect light received from the lens assembly 102 to the image sensor 101. In one embodiment, the reflective surface 102 is positioned so as to cause the optical path to be redirected orthogonally. Said differently, light passing through the lens assembly 102 turns, approximately 90 degrees, as it makes its journey to the image sensor 101. It will be clear to those of ordinary skill in the art having the benefit of this disclosure, however, that other geometric configurations are possible.

In one embodiment, the reflective surface 103 is simply a mirror. However, as will be clear from the discussion of the various embodiments set forth below, other devices may also be used as the reflective surface 103. For example, in one embodiment, the reflective surface 103 is a phase shifting mirror. In another embodiment, the reflective surface is a switchable mirror. The device used as the reflective surface 103 depends upon the application, the device into which the image capture device is integrated, and so forth.

The focal length alteration device 104 is positioned, in one embodiment, between the lens assembly 102 and the reflective surface 103. The focal length alteration device 104 can have physical characteristics that alter the distance between the lens assembly 102 and the image sensor 101. This distance is referred to herein as the "focal length." In one embodiment, for example, the focal length alteration device comprises an interference layer configured to reflect one color of light and to absorb others. The focal length alteration device 104 may alternatively have electronically controllable optical properties. In such embodiments, by changing the optical property of the focal length alteration device 104, the distance between the lens assembly 102 and the image sensor 101 is altered.

An image processing circuit 105 is coupled to the image sensor 101. The image processing circuit 105 is configured to resolve a composite image by using at least a pair of images captured at different focal lengths. For instance, the image processing circuit 105 can use a first image captured at a first focal length 109 as a luminous component, and a second image captured at a second focal length 110 as a color component for image processing. The image processor 105 uses the luminous component and the color component to resolve a focused image 113 by, in one embodiment, using the following equations:

$$Y=(0.257*color_1)+(0.504*focused\ color)+(0.098*color_2)+16 \quad (EQ.\ 1)$$

$$C_1=V=(0.439*color_1)-(0.368*focused\ color)-(0.071*color_2)+128 \quad (EQ.\ 2)$$

$$C_2=U=-(0.148*color_1)-(0.291*focused\ color)+(0.439*color_2)+128 \quad (EQ.\ 3)$$

Some embodiments of the invention employ an aperture device 107 that is configured to limit the amount of light to the image sensor 101. An aperture controller 108 is configured to provide control signals to the aperture device 107 so as to make the aperture opening larger or smaller. In some embodiments, the aperture device 107 may also be used as a shutter.

A controller 112 is configured to capture images by actuating the image sensor 101. The controller 112, which may be a microprocessor having executable code embedded in associated memory, works in concert with the focal length alteration device 104 to capture multiple images for processing. Each of the multiple images, in one embodiment, is taken at differing focal length alteration device 104 states. Thus, the controller 112 may be coupled to both the focal length alteration device 104 and the image sensor 101. The controller 112 places the focal length alteration device 104 in a first state so as to cause light—or sometimes one wavelength spectrum of light—to reach the image sensor 101 along a first focal length 109, and captures a first image. The controller 112 then places the focal length alteration device 104 in a second state so as to cause the light, or another wavelength spectrum of light, to reach the image sensor 101 along a second focal length 110, and captures a second image. The image processing circuit 105, which in one embodiment is an operational software module running on the controller 112, then resolves a focused image 113 from these images.

Figure 2:
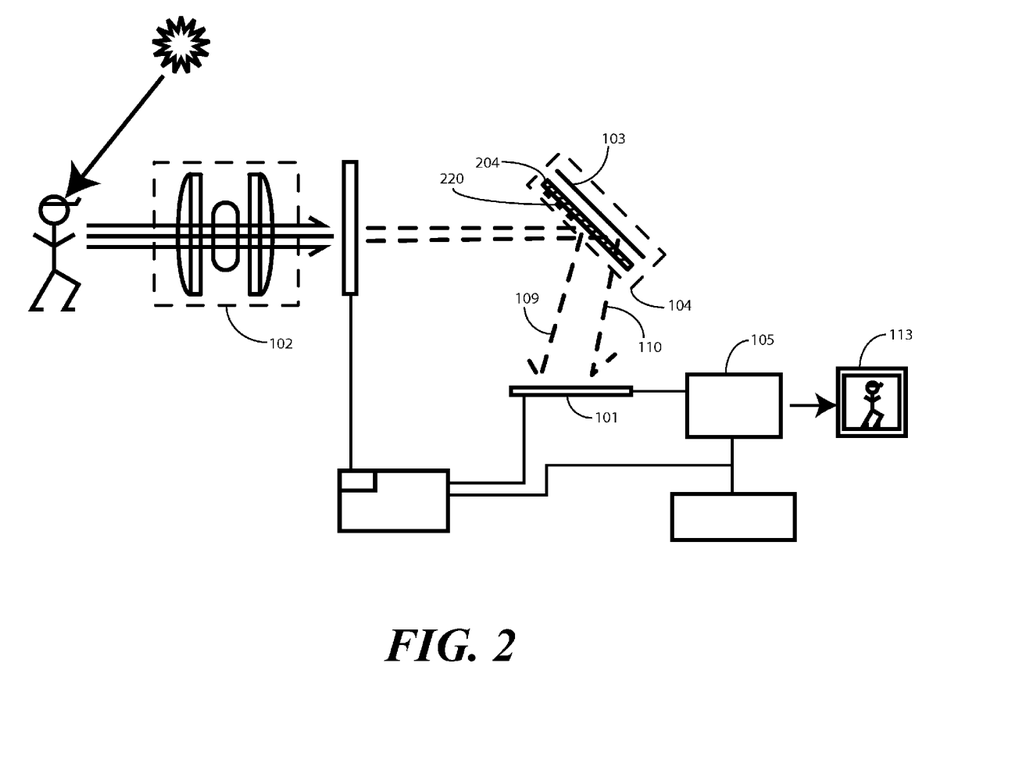
FIG. 2 illustrates a block diagram of one embodiment of an image capture device in accordance with the invention.

Turning now to FIG. 2, illustrated therein is a first embodiment of an image capture device configured to electronically focus an image in accordance with the invention. In the embodiment of FIG. 2, an interference layer 204 is used as the focal length alteration device. The interference layer 204 can have disposed thereon, or integrated therein, an interference coating 220 that is configured to reflect light having a predetermined wavelength spectrum or color.

The interference coating 220 is an optical coating that causes light waves of varying frequencies to interact by causing selective phase differences and by making use of the dependence of reflectivity of the interference layer 204 on index of refraction. In short, when light waves interfere destructively, the intensity of the wave is diminished. The interference coating 220 manipulates wave interference selectively to control a reflected wavelength spectrum's intensity. As such, a "red" interference coating 220 on an interference layer 204 causes red light to be reflected. Other wavelengths may pass through the interference layer 204. Interference coatings generally are known in the art and are commercially available from select manufacturers. One source of further information on interference coatings is the text "Design of Optical Interference Coatings" by Alfred Thelen, published by Mcgraw-Hill, 1989, ISBN-10: 0070637865, ISBN-13: 978-0070637863.

As used in FIG. 2, the interference layer 204, being positioned closer to the lens assembly 102 than the reflective surface, causes light of a predetermined wavelength spectrum to traverse a shorter distance from lens assembly 102 to image sensor 101 than do other wavelength spectra. Using a red interference coating as an example, light passes from the image object 111 through the lens assembly 102. The light then intersects the interference layer 204. Red light reflects off the interference layer 204 and proceeds to the image sensor 101 along an optical path having a first focal length 109. Non-red light passes through the interference layer 204 to the reflective surface 103. This light is reflected off the reflective surface 103 to the image sensor 101 along a second optical path having a second focal length 110. The image processing circuit 105 then resolves the two images into a focused image 113.

One method of resolution of these two images is by using a general optical mask function as set forth by U.S. Pat. No. 5,748,371 to Cathey, entitled "Extended Depth of Field Optical Systems," which is incorporated herein by reference. As is known in the art, one may calculate the response of an incoherent optical transfer function for any value of misfocus with a general optical mask function. Since the physical placement of the interference layer 204 relative to the lens assembly 102 and the image sensor 101 is known, as is the physical placement of the reflective layer 103 relative to the lens assembly 102 and the image sensor 101, an optical mask function may be derived. The resulting images may then be resolved into a single focused image 113. An alternate method of resolving images is to process the images in different colors separately.

Figure 3:
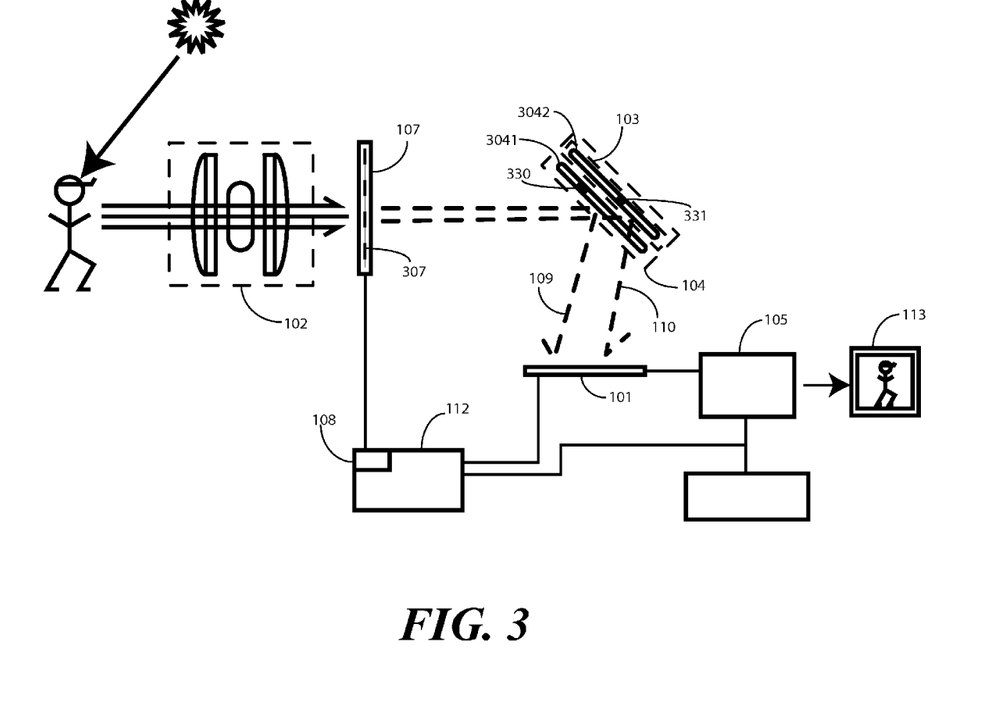
FIG. 3 illustrates a block diagram of another embodiment of an image capture device in accordance with the invention.

Turning now to FIG. 3, illustrated therein is an alternate embodiment of an image capture device configured to electronically focus on an image in accordance with the invention. In the embodiment of FIG. 3, a pair 304 of switchable mirrors 3041, 3042 is used as the focal length alteration device. The embodiment of FIG. 3 is compact and is well suited to portable electronic device applications, as the entire system can be manufactured with measurements of 3 mm×3 mm×5 mm, or less. Image capture devices in accordance with this embodiment can obtain focus on objects ranging from several centimeters from the lens assembly 102 to infinity. The focusing action is simply achieved by electrical switching without any additional hardware or moving parts.

Each of the switchable mirrors 3041, 3042 is an electronically controllable device that has a variable state of reflectivity. For instance, in one embodiment, the switchable mirrors 3041,3042 have both a reflective state and a pellucid state. In the reflective state, the switchable mirrors 3041,3042 operate as reflective surfaces and resemble metallic mirrors. In the pellucid state, the switchable mirrors 3041,3042 become translucently clear—essentially like glass—transmitting substantially all incident light. Some loss arises due to controlling electrodes or film surfaces. While some embodiments herein employ the generally reflective state—referred to herein as the reflective state—and the generally clear state—referred to herein as the pellucid state, note that it is also possible to configure the switchable mirrors 3041,3042 in other states as well. Intermediate transmittance or reflectance states can be achieved by altering a control voltage applied to the switchable mirrors 3041,3042. Suitable switchable mirrors 3041,3042 are taught, for example in U.S. Pat. No. 7,042,615, issued to Richardson on May 9, 2006, entitled "Electrochromic devices based on lithium insertion." Switchable mirrors are commercially available from companies such as Kent Optronics, Inc. of Kent, Ohio. The switchable mirrors 3041,3042 are low power, which is beneficial to portable electronics. The current required to switch exemplary switchable mirrors 3041, 3042 from state to state is on the order of 0.1 mA with a 2.5 V source.

Figure 4:
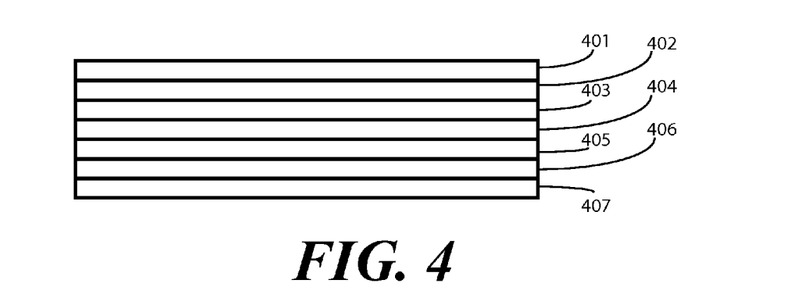
FIG. 4 illustrates a sectional view of one embodiment of a switchable mirror in accordance with embodiments of the invention.

Turning briefly to FIG. 4, illustrated therein is a cross section of a switchable mirror. In the embodiment of FIG. 4, the switchable mirror is an electrolyte-based device that may be changed from a reflective state to a pellucid state with the application of voltage to a pair of electrodes 403,405. The electrodes 403,405 are disposed about an electrolyte layer 404, which in one embodiment comprises lithium phosphorous oxynitride (LiPON). Each electrode 403,405 is adjacent to a layer of transparent conductive oxide 402,406, such as indium tin oxide (ITO) or the zinc oxide (ZnO), which is used for making electrical connections. The overall assembly resides between two layers of glass 401,407.

Figure 5:
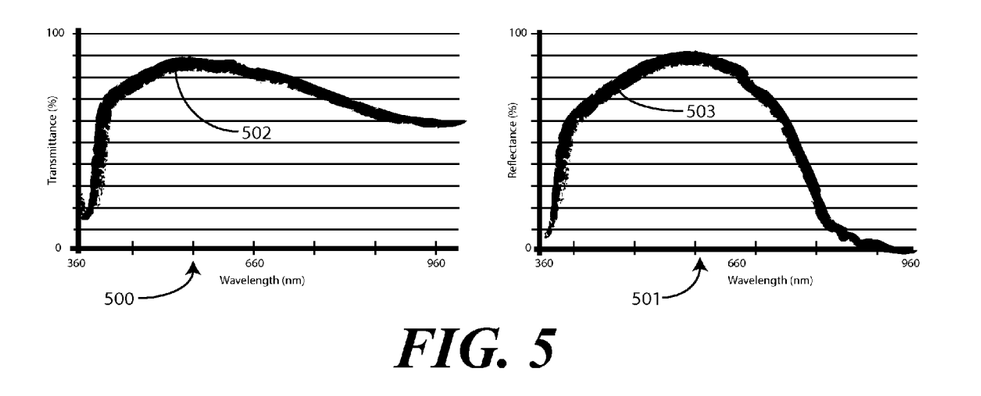
FIG. 5 illustrates graphs of transmittance and reflectance properties of one embodiment of a switchable mirror in accordance with embodiments of the invention.

Turning briefly to FIG. 5, illustrated therein are the physical properties of such a switchable mirror. Graph 500 shows a transmission plot 502 versus wavelength of a switchable mirror in the pellucid state, while graph 501 shows a reflectivity plot 503 versus wavelength of a switchable mirror in a reflective state. Note that these plots are taken from exemplary switchable mirrors positioned at a 45-degree angle relative to the incident light.

Turning now back to FIG. 3, a pair 304 of switchable mirrors 3041,3042 is being used as the focal length alteration device 104. Note that while a pair 304 of switchable mirrors 3041,3042 is shown in the illustrative embodiment of FIG. 4 for additional automatic focusing capability, a single switchable mirror may be used as the focal length alteration device 104.

In the embodiment of FIG. 3, each switchable mirror 3041, 3042 is coated with a color filter coating 330, 331. Such coatings are manufactured, for example, by 3M. When the switchable mirror is in the reflective state, it reflects light in accordance with its respective color filter coating 330,331. As such, each filter coating 330,331 causes the corresponding switchable mirror 3041,3042 to reflect a predetermined wavelength spectrum when that switchable mirror 3041,3042 is in the reflective state. Similarly, when the switchable mirror is in the pellucid state, it transmits light in accordance with its respective filter coating 330,331.

Each switchable mirror 3041,3042 is positioned so as to redirect light from the lens assembly 102 to the image sensor 101 when in the reflective state. When in the pellucid state, light from the lens assembly 102 passes through each switchable mirror 3041,3042 to the reflective surface 103, where it is redirected to the image sensor 101.

When in operation, the controller 112 first causes the first switchable mirror 3041 to enter the reflective state. A first color or wavelength spectrum is then directed from the lens assembly 102 to the image sensor 101 along a first optical path having a first focal length 109. The controller 112 then causes the image sensor 101 to capture a first image.

The controller 112 then causes the first switchable mirror 3041 to enter the pellucid state, and causes the second switchable mirror 3042, which is disposed between the first switchable mirror 3041 and the reflective surface 103, to enter the reflective state. As the color filter coating 330 of the first switchable mirror 3041 is different from the color filter coating 331 of the second switchable mirror 3042, a second color or wavelength spectrum is directed from the lens assembly 102 to the image sensor. As the second switchable mirror 3042 is farther from the lens assembly 102, perhaps by a couple of tenths of millimeters, the second wavelength spectrum is directed along a second optical path having a second wavelength 110. The controller 112 causes the image sensor to capture a second image.

The controller 112 then causes both the first switchable mirror 3041 and the second switchable mirror 3042 to enter the pellucid state. Light from the lens assembly 102 then passes through the switchable mirrors 3041,3042 to the reflective surface 103 and is redirected to the image sensor 101. The controller 112 then causes the image sensor to capture a third image. The image processing circuit 105 then resolves the three images into a composite, focused image 113.

In the embodiment of FIG. 3, as with all the embodiments described herein, an aperture device 107 may be used to limit the amount of light passing from the lens assembly 102 to the image sensor 101. In one embodiment, a switchable mirror 307 is used as the aperture device 107. The switchable mirror 307 has an electronically selectable aperture state and is disposed between the lens assembly 102 and the focal length alteration device 104. The aperture controller 108 is configured to adjust the electronically selectable aperture state so as to limit the light passing from the lens assembly 102 to the image sensor 101.

Figure 6:
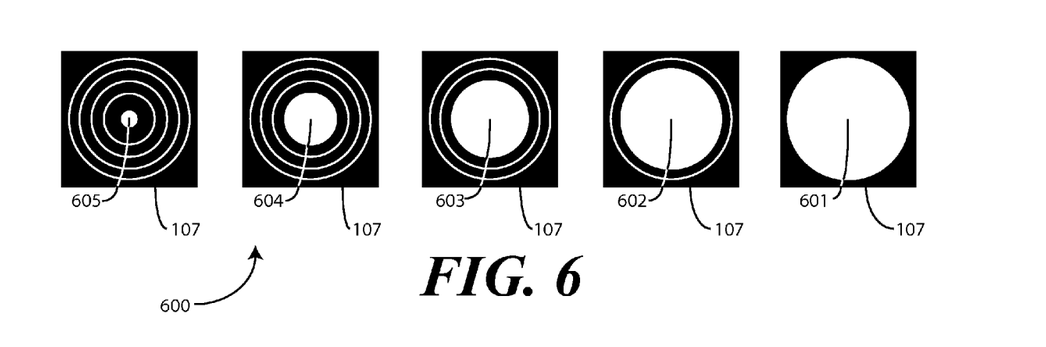
FIG. 6 illustrates plan views of various states of one embodiment of a switchable mirror having an aperture state in accordance with embodiments of the invention.

Turning briefly to FIG. 6, illustrated therein are exemplary aperture states 600 for the aperture device 107. By selectively depositing the electrodes (403,405) and the transparent conductive oxide layers (402,406), various concentric circles 601,602,603,604,605 may be controllable along the aperture device 107. By selectively actuating the various concentric circles 601,602,603,604,605, the "aperture" may be opened and closed, as well as partially opened or closed a predetermined amount. Note also that by selectively actuating all concentric circles 601,602,603,604,605, the aperture device 107 may be used as a shutter as well.

Turning back to FIG. 3, note that automatic focusing capability is not the only application for the system. Where, for example, the switchable mirrors 3041,3042 are used without color filter coatings 330,331, the system can be used for zoom capabilities as well. Assuming a far-field focus with the lens assembly 102, causing one of the switchable mirrors 3041, 3042 to enter the reflective state creates a different magnification, as seen by the image sensor 101, than when the switchable mirrors 3041,3042 are in the pellucid state due to the different focal lengths. As such, for a single lens assembly in a telephoto focus mode, image magnification, or "zoom," may also be altered by the selective use of the switchable mirrors 3041,3042.

Figure 7:
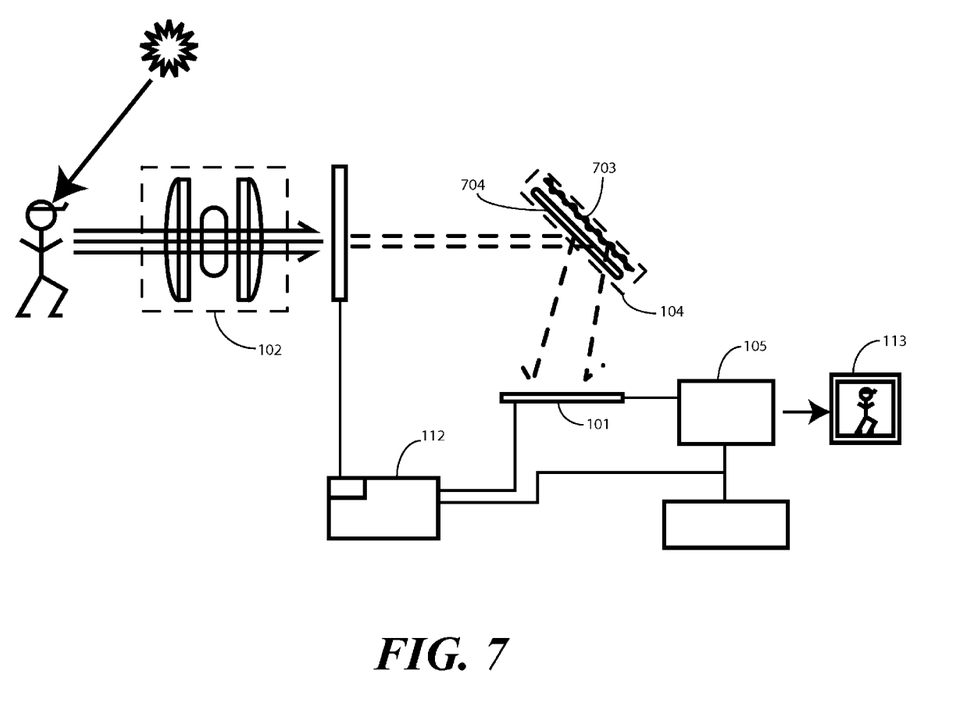
FIG. 7 illustrates another block diagram of one embodiment of an image capture device in accordance with the invention.

Turning now to FIG. 7, illustrated therein is another embodiment of an image capture device configured for electronic focus in accordance with the invention. In the embodiment of FIG. 7, the focal length alteration device 104 comprises a switchable mirror 704. Rather than using a reflective surface as described above, such as a standard mirror, the embodiment of FIG. 7 includes a phase shifting mirror 703.

The phase shifting mirror 703 is configured to redirect received light from the lens assembly 102 to the image sensor 101.

Phase shifting mirrors are devices capable of shifting certain polarizations of light by predetermined amounts. Phase shifting mirrors are well known in the art. One example of a phase shifting mirror is taught in U.S. Pat. No. 4,322,130, issued to Ito, et al. on Mar. 30, 1982, entitled "Phase shifting mirror." Phase shifting mirrors take advantage of the polarization properties of light resulting from reflections from the boundary surface of the mirror and variations in refractive index and film thickness of other materials in the mirror. A predetermined phase difference may be obtained between one polarization reflected component and another polarization reflected component. In one embodiment, a reflective phase plate with spatially varied phase modulation, or a spatial light modulator, may be used as a phase shifting mirror to alter the focal length or to modulate the optical path (either distance or refractive index). Such a reflective phase plate can act as a cubic-phase modulation reflective phase mask, and cubic phase modulation can be implemented by a tunable electro-optics method such liquid crystal using spatially varied external voltage, fixed pattern of spatially varied thickness optical thin film coating.

The operation of the embodiment of FIG. 7 is somewhat different than that previously described. In FIG. 7, the switchable mirror 704 is actuated to the reflective state for fixed focus mode image capture. For automatic focusing, the controller 112 causes the switchable mirror 704 to enter the pellucid state, such that light passes from the lens assembly 102 to the image sensor via the phase shifting mirror 703. The phase shifting mirror 703 then causes one polarization of light hitting the image sensor 101 to have a phase shift from another polarization of light.

The image processing circuit 105 then resolves focus using a Wavefront Coding processing technique in this embodiment. Wavefront Coding is a method pioneered by Edward Dowski and Thomas Cathey at the University of Colorado for increasing sharpness of digital images by blurring images across a focal plane. Wavefront Coding, as set forth in U.S. Pat. No. 5,748,371 to Cathey, entitled "Extended Depth of Field Optical Systems," uses a complex lens assembly having a mask with complex variations in opaqueness, thickness, or index of refraction to affect the optical properties of light passing through the Wavefront Coded lens assembly. Embodiments of the present invention differ from Wavefront Coded systems in that the complex lens assemblies required by Wavefront Coded systems are not required. In contrast, embodiments of the present invention employ a simple phase shifting mirror 703 with conventional lens assemblies 102.

The back end processing of Wavefront Coding, however, is useful in resolving the multiple-focal length images of embodiments of the present invention. The image processing circuit 105 is configured to resolve a composite, focused image 113 by using an image captured with a first phase shift and another image captured with a second phase shift using Wavefront Coding processing techniques. Note that a single image may be used where there is sufficient processing power to resolve such an image.

Figure 8:
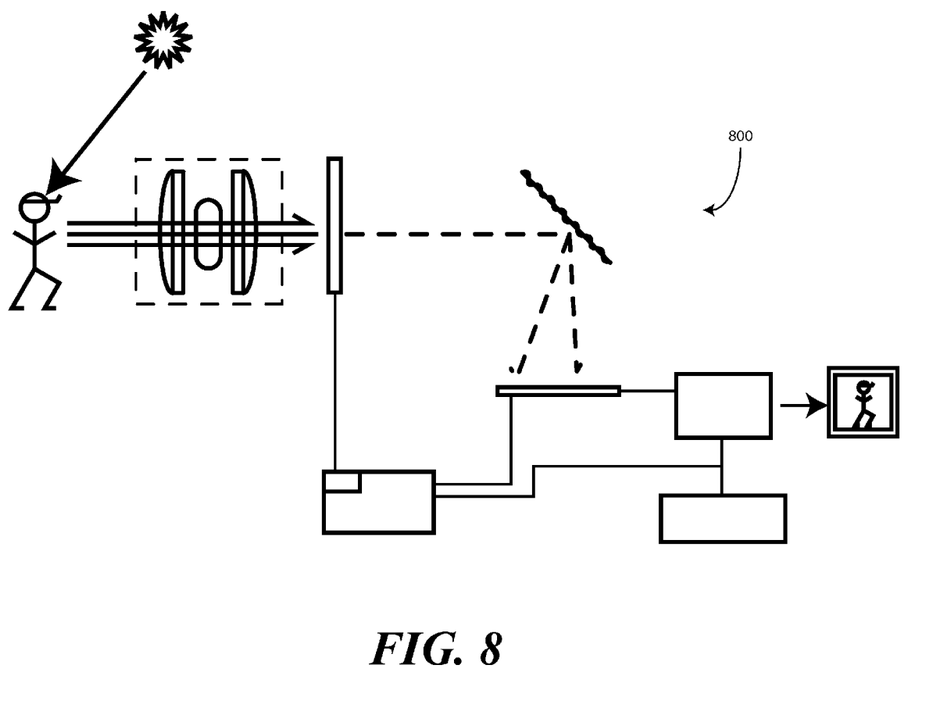
FIG. 8 illustrates another block diagram of one embodiment of an image capture device in accordance with the invention.

Note that the switchable mirror 704 is optional. Where fixed focus operation is either not needed or not desired, the switchable mirror can be omitted. Such an embodiment 800 is illustrated in FIG. 8.

Note also that the elements of the system can be rearranged depending upon application. For instance, it was noted above that the lens assembly 102 may include multiple lens components. Many portable electronic devices, such as "smart" mobile telephones and the like are becoming thinner and thinner. As such, the various components may be moved around to achieve a thinner assembly.

Figure 9:
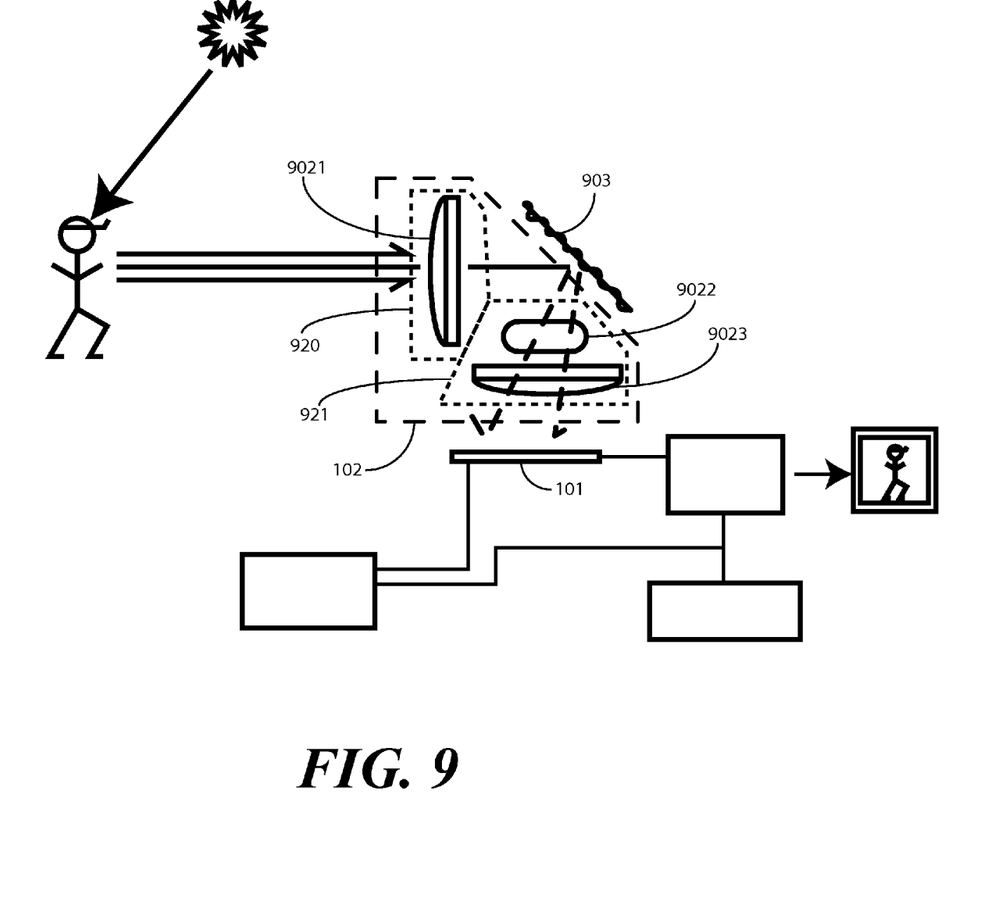
FIG. 9 illustrates a block diagram of an embodiment of a compact image capture device in accordance with the invention.

Turning now to FIG. 9, illustrated therein is one such "thin" embodiment of an image capture device configured to electronically focus an image in accordance with embodiments of the invention. In FIG. 9, the lens assembly 102 comprises three lens elements 9021,9022,9023. These three lens elements 9021,9022,9023 have been rearranged into a first fixed lens assembly 920 and a second lens assembly 921. The second lens assembly 921 is disposed between the phase shifting mirror 903 and the image sensor 101. This results in a more compact image capture device.

Figure 10:
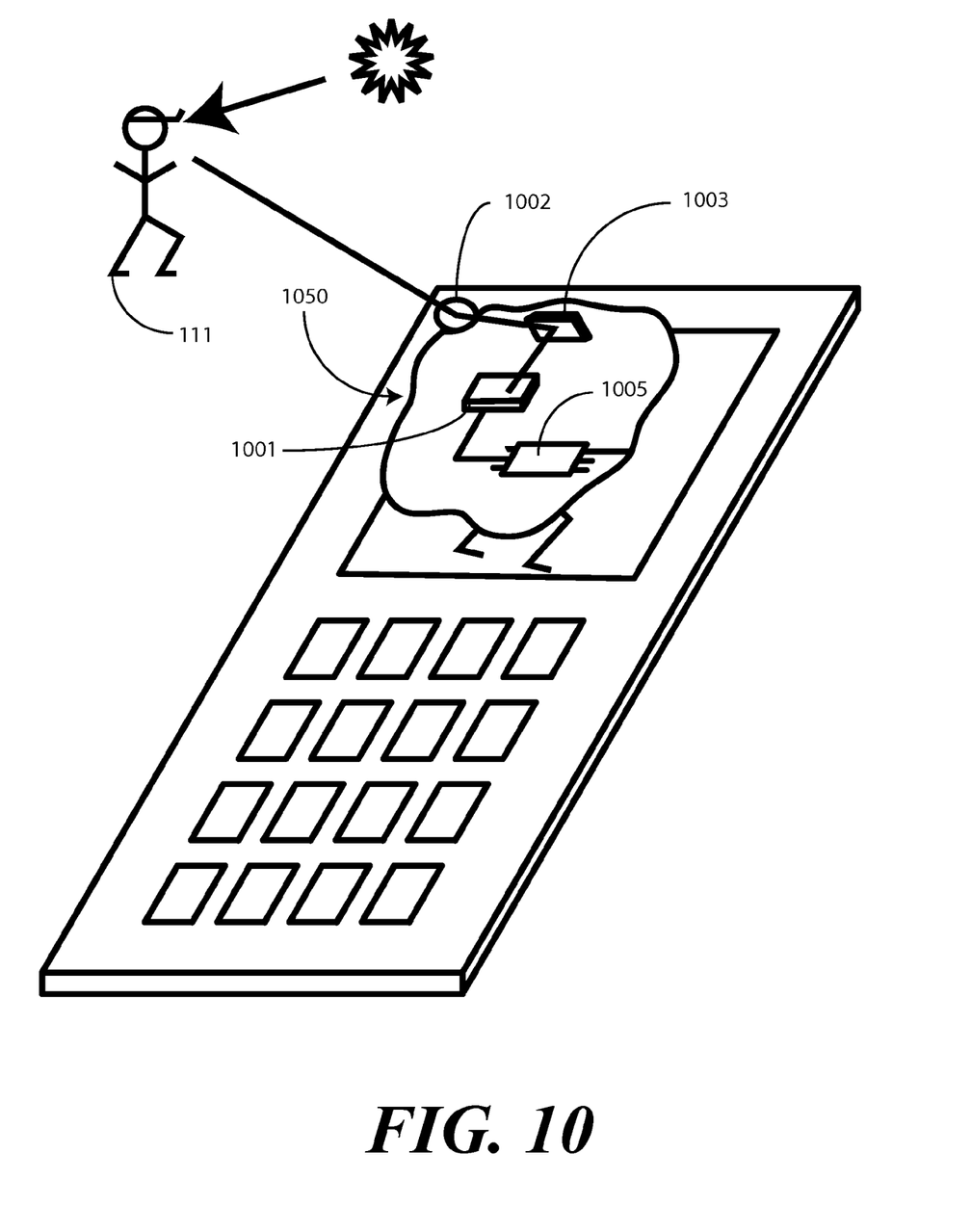
FIG. 10 illustrates a perspective view of an electronic device, with cutaway section, having an image capture device in accordance with embodiments of the invention.

Turning now to FIG. 10, illustrated therein is a portable electronic device 1000 having an image capture device 1050 with a fixed lens assembly 1002 in accordance with embodiments of the invention. The image capture device 1050, which may be any of the embodiments previously described, is configured to electronically focus an image 111 without the use of moving mechanical parts.

In one embodiment, the image capture device 1050 includes a light redirection device 1003, such as a reflective surface, switchable mirror, or phase shifting mirror, that is capable of altering either the focal length of the image capture device 1050 or the phase of light received by the fixed lens assembly 1002. As described above, a switchable mirror may change the focal length by transitioning from a pellucid state to a reflective state. A phase shifting mirror may change the phase by its materials and their refraction properties.

An image sensor 1001 is disposed so as to receive light from the light redirection device 1003. An image processing circuit 1005, which is coupled to the image sensor 1001, is configured to resolve a focused, composite image by using a first image having a first characteristic of redirection and a second image having a second characteristic of redirection. Examples of characteristics of redirection include phase shifts, polarization alteration, and focal length changes as described above.

In one embodiment, the light redirection device 1003 comprises a reflective surface and a focal length alteration device. The reflective surface is disposed so as to redirect received light from the fixed lens assembly 1002 to the image sensor 1001. The focal length alteration device, which may be a switchable mirror for example, is disposed between the fixed lens assembly 1002 and the reflective surface 1003 so as to selectably alter a focal length from the fixed lens assembly 1002 to the image sensor 1001.

In another embodiment, the light redirection device 1003 comprises a phase shifting mirror. The phase shifting mirror is disposed so as to redirect received light from the fixed lens assembly 1002 to the image sensor 1001 as described above.

The advantages and benefits of embodiments of the invention are numerous. First, electronic focusing systems as described herein offer a low-cost alternative to conventional auto focus systems that employ moving, mechanical parts. Further, systems described herein offer improvements to the depth of focus and focus range under many lighting conditions. Additionally, embodiments of the invention using Wave Front Coding processing offer advantages over systems using Wave Front Coding optics in that manufacturing tolerance issues may be resolved with the ease of manufacture of systems described here. Additionally, manufacturing costs are reduced over traditional Wave Front Coding systems.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. An image capture device configured to electronically focus an image, comprising:
   an image sensor;
   a lens configured to receive light;
   a reflective surface disposed so as to redirect received light from the lens to the image sensor; and
   an optical path length alteration device including a single electronically alterable mirror switchable between at least a reflective state and a pellucid state, the single electronically alterable mirror being disposed between the lens and the reflective surface, operable to selectably alter an optical path length traveled by the received light between the lens to the image sensor between at least a first optical path length when the single electronically alterable mirror is in the reflective state and a second optical path length when the single electronically alterable mirror is in the pellucid state.

2. The image capture device of claim 1, wherein the single electronically alterable mirror has an electronically selectable aperture state and is disposed between the lens and the optical path length alteration device.

3. The image capture device of claim 2, further comprising an aperture controller configured to adjust the single electronically selectable aperture state so as to limit the light passing from the lens to the image sensor.

4. The image capture device of claim 1, further comprising an image processing circuit coupled to the image capture device, wherein the image processing circuit is configured to resolve a composite image by using a first image captured at a first focal length as a luminous component for processing and a second image captured at a second focal length as a color component for processing.

5. The image capture device of claim 1, wherein the single electronically alterable mirror is disposed so as to redirect the light from the lens to the image sensor when in the reflective state.

6. The image capture device of claim 5, wherein the reflective surface redirects the light received from the lens to the image sensor when the single electronically alterable mirror is in the pellucid state.

7. The image capture device of claim 5, further comprising a controller coupled to the single electronically alterable mirror and the image sensor, wherein the controller is configured to capture a first image with the image sensor when the single electronically alterable mirror is in the reflective state, and to capture a second image with the image sensor when the single electronically alterable mirror is in the pellucid state.

8. The image capture device of claim 7, wherein the reflective surface comprises a phase shift mirror.

9. The image capture device of claim 5, wherein the single electronically alterable mirror comprises a coating configured to reflect a predetermined wavelength spectrum when the single electronically alterable mirror is in the reflective state.

10. The image capture device of claim 1, wherein the optical path length alteration device comprises an interference layer having an interference coating configured to reflect light having a predetermined wavelength spectrum.

11. An image capture device configured to electronically focus an image, comprising:
    a single image sensor;
    a lens assembly configured to receive light;
    a phase shifting mirror;
    an electronically alterable mirror switchable between at least a reflective state and a pellucid state, the electronically alterable mirror being disposed between the lens assembly and the phase shifting mirror so as to alter an optical path length traveled by received light from the lens assembly to the single image sensor without moving parts; and
    an image processing circuit coupled to the single image sensor, wherein the image processing circuit is configured to resolve a composite image by using a first image captured with light having a first phase shift when the electronically alterable mirror is in one of the reflective state or the pellucid state and a second image captured with light having a second phase shift when the electronically alterable mirror is in another of the reflective state or the pellucid state.

12. The image capture device of claim 11, wherein the lens assembly comprises a first, fixed lens, further comprising a second lens assembly disposed between the phase shifting mirror and the single image sensor.

13. A portable electronic device comprising an image capture device having a fixed lens assembly and capable of electronically focusing an image, the image capture device comprising:
    a single light redirection device capable of altering an optical path traveled by light received by the fixed lens assembly without mechanically moving parts;
    an image sensor disposed so as to receive light from the single light redirection device; and
    an image processing circuit coupled to the image sensor, wherein the image processing circuit is configured to resolve a focused, composite image by using a first image having a first characteristic of redirection and a second image having a second characteristic of redirection;
    wherein the single light redirection device is fixed in position relative to the fixed lens assembly and the image sensor.

14. The portable electronic device of claim 13, wherein the light redirection device comprises:
    a reflective surface disposed so as to redirect received light from the fixed lens assembly to the image sensor; and
    an alteration device disposed between the fixed lens assembly and the reflective surface, configured to selectably alter the optical path from the fixed lens assembly to the image sensor.

15. The portable electronic device of claim 13, wherein the light redirection device comprises a phase shifting mirror disposed so as to redirect received light from the fixed lens assembly to the image sensor.

16. The image capture device of claim 1, wherein the optical path length alteration device comprises the reflective surface.

17. The image capture device of claim 1, wherein the lens assembly is geometrically and physically fixed relative to the image sensor.

* * * * *